(12) United States Patent
Pan et al.

(10) Patent No.: US 10,627,624 B2
(45) Date of Patent: Apr. 21, 2020

(54) HEAD-MOUNTED DISPLAY

(71) Applicant: Coretronic Corporation, Hsin-Chu (TW)

(72) Inventors: Haw-Woei Pan, Hsin-Chu (TW); Chih-Hsien Tsai, Hsin-Chu (TW); Chi-Tang Hsieh, Hsin-Chu (TW); Yi-Hsuang Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/660,956

(22) Filed: Jul. 27, 2017

(65) Prior Publication Data

US 2018/0031843 A1 Feb. 1, 2018

(30) Foreign Application Priority Data

Jul. 28, 2016 (CN) .......................... 2016 1 0604426
Dec. 19, 2016 (CN) .......................... 2016 1 1175892

(51) Int. Cl.
*G02B 27/14* (2006.01)
*G09G 5/00* (2006.01)
(Continued)

(52) U.S. Cl.
CPC ........... *G02B 27/0172* (2013.01); *G02B 5/02* (2013.01); *G02B 27/09* (2013.01); *H04N 9/315* (2013.01);
(Continued)

(58) Field of Classification Search
CPC .... G02B 2027/0123; G02B 2027/0145; G02B 2027/0178; G02B 2027/0192;
(Continued)

(56) References Cited

U.S. PATENT DOCUMENTS 5,467,104 A 11/1995 Furness, III et al.
5,701,132 A 12/1997 Kollin et al.
(Continued)

FOREIGN PATENT DOCUMENTS

CN 103399404 11/2013
CN 104216042 12/2014
CN 105593745 5/2016

OTHER PUBLICATIONS

Eunkyong Moon, et al., "Holographic head-mounted display with RGB light emitting diode light source," Optics Express, vol. 22, No. 6, Mar. 13, 2014, pp. 6526-6534.
(Continued)

*Primary Examiner* — William Choi
(74) *Attorney, Agent, or Firm* — JCIPRNET

(57) ABSTRACT

A head-mounted display including an apparatus body including a first part and a second part connected to the first part and an image display device disposed in the apparatus body is provided. The image display device projects an image to a projection target and includes an image output element, a plurality of lens elements, a light diffuser, and an imaging element. The imaging element projects the image beam to the projection target to display the image. The lens elements include a first lens element and a second lens element. The image output element generates an intermediate image on a transmitting path of the image beam between the first and second lens elements. The light diffuser is disposed on the transmitting path of the image beam and in a predetermined interval where the intermediate image is located at the center.

16 Claims, 11 Drawing Sheets

(51) Int. Cl.
  *G02B 27/01* (2006.01)
  *G02B 5/02* (2006.01)
  *G02B 27/09* (2006.01)
  *H04N 9/31* (2006.01)

(52) U.S. Cl.
  CPC ... *H04N 9/3173* (2013.01); *G02B 2027/0123* (2013.01); *G02B 2027/0145* (2013.01); *G02B 2027/0178* (2013.01)

(58) Field of Classification Search
  CPC .. G02B 27/01; G02B 27/0101; G02B 27/017; G02B 27/0172
  USPC .......................................... 359/630; 345/7–9
  See application file for complete search history.

(56) References Cited

U.S. PATENT DOCUMENTS

| | | |
|---|---|---|
| 5,757,544 A | 5/1998 | Tabata et al. |
| 6,057,966 A | 5/2000 | Carroll et al. |
| 6,157,352 A | 12/2000 | Kollin et al. |
| 6,829,095 B2 | 12/2004 | Amitai |
| 7,457,040 B2 | 11/2008 | Amitai |
| 7,719,769 B2 | 5/2010 | Sugihara et al. |
| 8,520,310 B2 | 8/2013 | Shimizu |
| 8,666,212 B1 | 3/2014 | Amirparviz |
| 8,836,844 B2 | 9/2014 | Hiasa et al. |
| 8,976,087 B2 | 3/2015 | Takeda et al. |
| 9,239,462 B2 | 1/2016 | Takeda et al. |
| 2008/0025667 A1 | 1/2008 | Amitai |
| 2010/0053729 A1 | 3/2010 | Tilleman et al. |
| 2010/0060551 A1 | 3/2010 | Sugiyama et al. |
| 2010/0079865 A1 | 4/2010 | Saarikko et al. |
| 2010/0149073 A1 | 6/2010 | Chaum et al. |
| 2011/0012874 A1 | 1/2011 | Kurozuka |
| 2013/0100524 A1 | 4/2013 | Magarill et al. |
| 2013/0235440 A1 | 9/2013 | Takeda et al. |
| 2014/0104580 A1 | 4/2014 | Tsai et al. |
| 2015/0192775 A1* | 7/2015 | Suzuki ............... G02B 27/0172 359/630 |
| 2016/0270656 A1 | 9/2016 | Samec et al. |
| 2016/0377868 A1 | 12/2016 | Ouderkirk et al. |
| 2017/0299867 A1 | 10/2017 | Tsai et al. |
| 2018/0031841 A1 | 2/2018 | Hsieh et al. |
| 2018/0031842 A1 | 2/2018 | Tsai et al. |

OTHER PUBLICATIONS

"Office Action of China Counterpart Application," dated Jul. 22, 2019, p. 1-p. 6.

* cited by examiner

ø=0.9mm

ø=4.0mm×2.5mm

HEAD-MOUNTED DISPLAY

CROSS-REFERENCE TO RELATED APPLICATION

This application claims the priority benefits of China application serial no. 201610604426.7, filed on Jul. 28, 2016, and China application serial no. 201611175892.4, filed on Dec. 19, 2016. The entirety of each of the above-mentioned patent applications is hereby incorporated by reference herein and made a part of specification.

BACKGROUND OF THE INVENTION

Field of the Invention

The invention relates to a display, and particular relates to a head-mounted display.

Description of Related Art

Near eye displays (NED) or head-mounted displays (HMD) are currently considered to be wearable displays that are full of potential. The NEDs are divided into the augmented reality (AR)-type and virtual reality (VR)-type based on whether an image of the surroundings can also be seen in actual use. Virtual reality emphasizes the sense of reality in a virtual world, namely a wide field of view that exceeds the extreme of human eyes. Augmented reality, on the other hand, focuses on providing the best image quality under the premise of making an apparatus more light-weighted. Currently, the key to the development of optical technologies for AR-type head-mounted displays is how the crucial requirements, namely field of view (FOV), size, weight, and appearance, can be taken into consideration at the same time.

In the conventional head-mounted display, an illumination beam modulated to meet the needs of an image output element is output from a light source module. After passing through the image output element, the illumination beam becomes a beam carrying image information (i.e., an image beam). Afterwards, the image beam passes through one or more lens elements and/or a mirror element and an imaging element and then is emitted to a projection target, such as the user's eye. Then, the crystalline lens of the eye focuses the image beam on the retina to form an image. Generally speaking, a projection area (in a circular shape, for example) of the image beam projected to the projection target is a circular area with a diameter from about 1.6 micrometers to about 2.0 micrometers. Therefore, the user's pupil must be located precisely on the position where the image beam is projected, so as to clearly see the virtual image. However, since the users' facial features may not be the same, an adjustment device must be additionally disposed, such that the position where the image beam is projected can be precisely located at the pupil positions of different users. In addition, in the conventional head-mounted display using an optical waveguide element, two beam splitter arrays are required to expand the lengths of the projection area of the image beam in two different directions (i.e., vertical and horizontal directions), making the size of the head-mounted display larger and cost of the head-mounted display higher.

The information disclosed in this "Description of Related Art" section is only for enhancement understanding of the background of the invention and therefore it may contain information that does not form the prior art that is already known to a person of ordinary skill in the art. Furthermore, the information disclosed in this "Description of Related Art" section does not mean that one or more problems to be solved by one or more embodiments of the invention were acknowledged by a person of ordinary skill in the art.

SUMMARY OF THE INVENTION

The invention provides a head-mounted display capable of expanding the user's field of view (FOG) and having a reduced size and weight. Therefore, the head-mounted display is comfortable to wear.

Other objects and advantages of the invention can be further illustrated by the technical features broadly embodied and described as follows. In order to achieve one or a part of or all of the objects or other objects, an embodiment of the invention is directed to a head-mounted display including an apparatus body and an image display device. The apparatus body includes a first part and a second part connected to the first part. The image display device is disposed in the apparatus body. The image display device is configured to project an image to a projection target. The image display device includes an image output element, a plurality of lens elements, and a light diffuser. The image output element outputs an image beam projected to the projection target by virtual image projection through the lens elements and the light diffuser, so as to display the image. The lens elements include a first lens element and a second lens element. The image output element generates an intermediate image on a transmitting path of the image beam between the first lens element and the second lens element. The light diffuser is disposed on the transmitting path of the image beam and in a predetermined interval where the intermediate image is located at the center.

Based on the above, the embodiments of the invention at least have one of the following advantages or effects. In the image display device according to the embodiments of the invention, the light diffuser is disposed on the transmitting path of the image beam and in the predetermined interval where the intermediate image is located at the center. Therefore, an area of projection of the image beam on a projection target is larger. Besides, the head-mounted display is comfortable to wear and capable of expanding the field of view (FOV) of the user. Moreover, the head-mounted display has a reduced size and weight.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
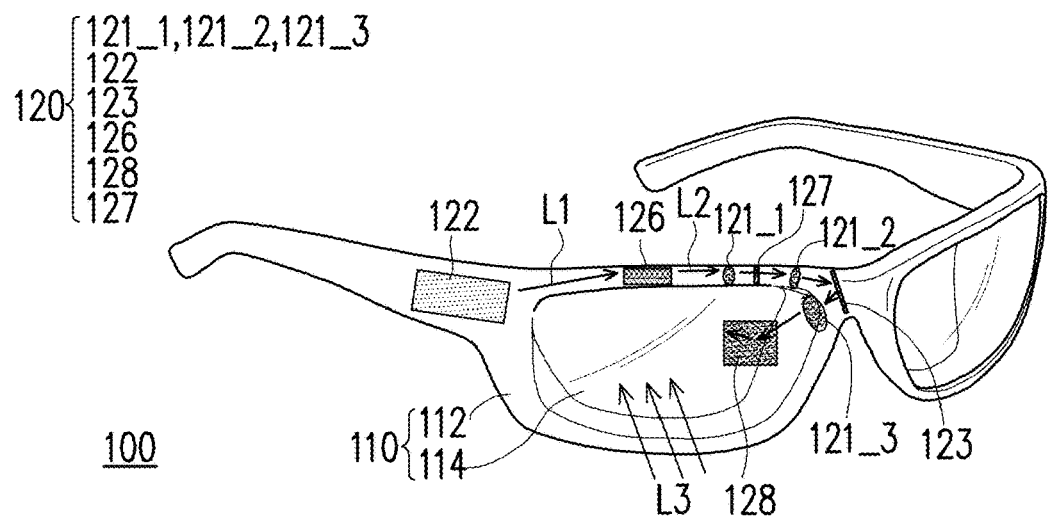
FIG. 1 is a schematic view illustrating a head-mounted display according to an embodiment of the invention.

FIG. 1 is a schematic view illustrating a head-mounted display according to an embodiment of the invention. Referring to FIG. 1, a head-mounted display 100 of this embodiment includes an apparatus body 110 and an image display device 120. The apparatus body 110 includes a first part 112 and a second part 114 connected to the first part 112. In this embodiment, the apparatus body 110 includes spectacles or eyeglasses, for example. However, the type and configuration of the spectacles or eyeglasses shall not be construed as limitations on the invention. The first part 112 includes at least one of a frame, a holder, and a nose pad. In this embodiment, the frame, the holder, and the nose pad may be separately manufactured and then assembled by using a screw or a similar fixer, for example In an embodiment, the frame, the holder, and the nose pad may also be integrally formed. The invention does not intend to impose a limitation on the type and configuration of the apparatus body 110. The second part 114 includes a lens. The number of the lens may be one or two or more, for example, and the lens may be assembled on the frame. In other embodiments, the first part 112 and the second part 114 may be integrally formed. For example, the first part 112 and the second part 114 may be integrally formed to be a goggle structure.

In this embodiment, the image display device 120 is disposed in the apparatus body 110. The image display device 120 is configured to project an image to a projection target. The projection target is a user's eye (e.g., a projection target 800 shown in FIG. 3), for example. In this embodiment, the image display device 120 includes a light source module 122, an image output element 126, an imaging element 128, a plurality of lens elements 121_1, 121_2, and 121_3, a mirror element 123, and a light diffuser 127. In this embodiment, the lens elements 121_1, 1212, and 121_3 are disposed on a transmitting path of an image beam L2. In addition, the lens elements 121_1, 121_2, and 121_3 are disposed between the image output element 126 and the imaging element 128. The mirror element 123 is disposed on the transmitting path of the image beam L2, and the mirror element 123 is disposed between the lens element 121_2 and the lens element 121_3. In this embodiment, the light source module 122, the image output element 126, the lens element 121_1 (first lens element), the lens element 121_2 (second lens element), the lens element 121_3 (third lens element), the light diffuser 127, and the mirror element 123 are disposed dispersedly in the first part 112 of the apparatus body 110.

For example, the light source module 122 may be disposed at the holder of the first part 112. The image output element 126 may be disposed at the frame of the first part 112. The lens elements 121_1, 121_2, and 121_3 and the light diffuser 127 are disposed dispersedly in the first part 112 of the apparatus body 110. In this embodiment, the imaging element 128 is disposed in one of the first part 112 and the second part 114 of the apparatus body 110. For example, the imaging element 128 may be integrated onto the lens of the spectacles or located at an inner side of the lens and tightly attached to the lens, or the imaging element 128 may be disposed in the first part 112 near the nose pad (not shown).

In this embodiment, the light source module 122 is configured to output the illumination beam L1 to the image output element 126. The image output element 126 modulates the illumination beam L1 to form the image beam L2, and outputs the image beam L2 to the lens elements 121_1, 121_2, and 121_3, the light diffuser 127, and the mirror element 123. The image beam L2 is transmitted to the imaging element 128 through the lens elements 121_1, 121_2, and 121_3, the light diffuser 127, and the mirror element 123. The imaging element 128 then projects the image beam L2 to the projection target by virtual image projection, so as to display the image. In this embodiment, the mirror element 123 is configured to change the transmitting direction of the image beam L2. For example, the mirror element 123 includes a reflective mirror configured to reflect the image beam L2 from the lens element 121_2 to the lens element 121_3. The number of the mirror element 123 in this embodiment is one, for example. However, based on the designs of different light paths, the number of the mirror element 123 may also be plural. The invention does not intend to impose a limitation on the number of the lens element 123.

Figure 3:
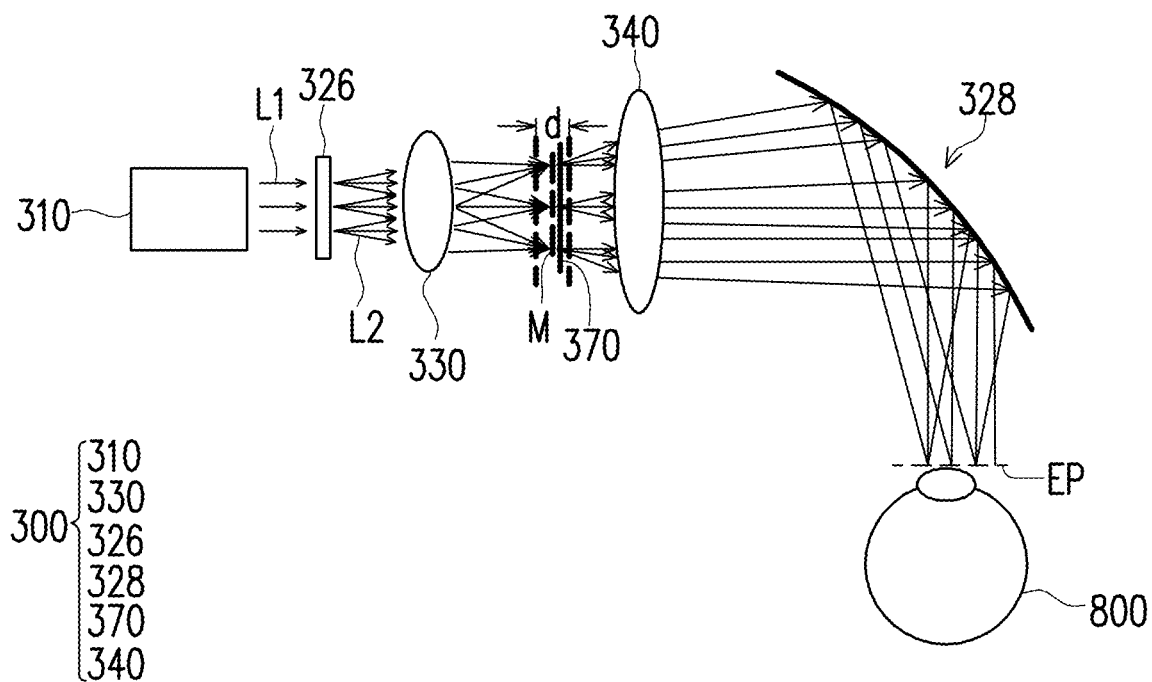
FIG. 3 is an optical schematic view illustrating an image display device according to an embodiment of the invention.

In this embodiment, the image output element 126 generates an intermediate image, such as an intermediate image M shown in FIG. 3, on the transmitting path of the image beam L2 between the lens elements 121_1 and 121_2. In this embodiment, the light diffuser 127 is disposed on the transmitting path of the image beam L2 and in a predetermined interval where the intermediate image is located at the center. In an embodiment, the light diffuser 127 is disposed at a position where the intermediate image M is generated on the transmitting path of the image beam L2, for example. However, it should be noted that the invention does not intend to impose a limitation on the position where the light diffuser 127 is disposed in the predetermined interval.

In this embodiment, an ambient beam L3 passes through the second part 114 of the apparatus body 110 and is projected to the projection target, for example, such that the head-mounted display 100 is enabled to provide an augmented reality function. However, the method of dispersedly disposing the respective components of the image display device 120 in the embodiments of the invention may also be used in a head-mounted display for virtual reality or mixed reality (MR). The invention does not intend to impose a limitation on the applicability of the image display device 120.

In this embodiment, the image output element 126, the lens elements 121_1, 121_2, and 121_3, the light diffuser 127, and the mirror element 123 are arranged along the first part 112 and the second part 114. For example, in this embodiment, the area where the image output element 126, the lens elements 121_1, 121_2, and 121_3, the light diffuser 127, and the mirror element 123 are arranged is an area near a position where the first part 112 and the second part 114 are connected. In this embodiment, the illumination beam L1 that is modulated in color and meets the needs of the image output element 126 is emitted by the light source module 122. After passing through the image output element 126, the illumination beam L1 becomes a beam carrying image information (i.e., the image beam L2). Then, the image beam L2 is emitted into the user's eye after passing through the lens elements 121_1 and 121_2, the light diffuser 127, the lens element 1213, the mirror element 123, and the imaging element 128, and is focused on the retina by the crystalline lens of the user's eyes and forms an image (as a virtual image, for example).

Figure 2:
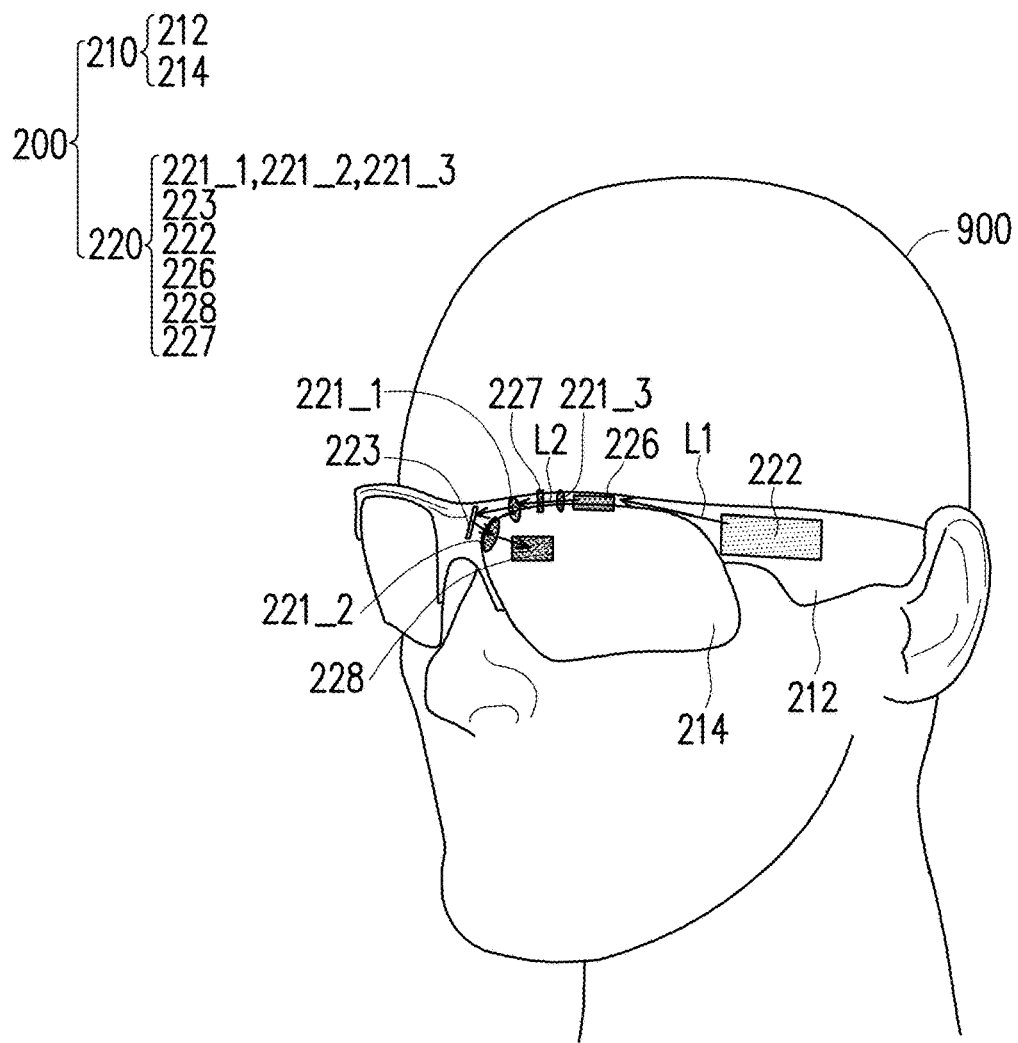
FIG. 2 is a schematic view illustrating a head-mounted display according to another embodiment of the invention.

However, it should be understood that the invention does not intend to impose a limitation on the type and configuration of the apparatus body (e.g., spectacles or eyeglasses). FIG. 2 is a schematic view illustrating a head-mounted display according to another embodiment of the invention. Referring to FIGS. 1 and 2, a head-mounted display 200 of this embodiment is similar to the head-mounted display 100 in the embodiment shown in FIG. 1. The difference therebetween mainly lies in the configuration of an apparatus body 210. For example, in this embodiment, a first part 212 of the apparatus body 210 does not completely enclose the entire edge of a second part 214.

In this embodiment, the projection target is located on a reference plane, and a projection of an image output element 226 on the reference plane is above the projection target. For example, the projection target is the eye of a user 900, and the reference plane is a surface of the face of the user 900. In this embodiment, the projection of the image output element 226 on the surface of the face of the user 900 is located above the eye and near the eyebrow. In other words, the projection of the image output element 226 on the reference plane is above the projection target. In this embodiment, the lens elements 221_1 and 221_2 are located on an inner side of the eye and close to the nasal bridge while away from the ear.

In this embodiment, with the user 900 as reference, a light source module 222 is disposed on a left side of the user 900, for example. The light transmitting direction is from left to right and then back to left. Namely, the image beam L2 is transmitted from the user 900's eyebrow to his/her nasal bridge, and then transmitted from the nasal bridge to the eye. Moreover, in this embodiment, the imaging element 228 may be integrated onto and combined together with the lens or, as shown in FIG. 1, disposed at the inner side of the lens and tightly attached to the lens.

Besides, the descriptions of the embodiment shown in FIG. 1 have provided sufficient teaching, suggestions, and explanations for embodiment concerning the locations and operations of the respective components in the head-mounted display 200 of this embodiment. Thus, details in these regards will not be reiterated below.

Figure 4:
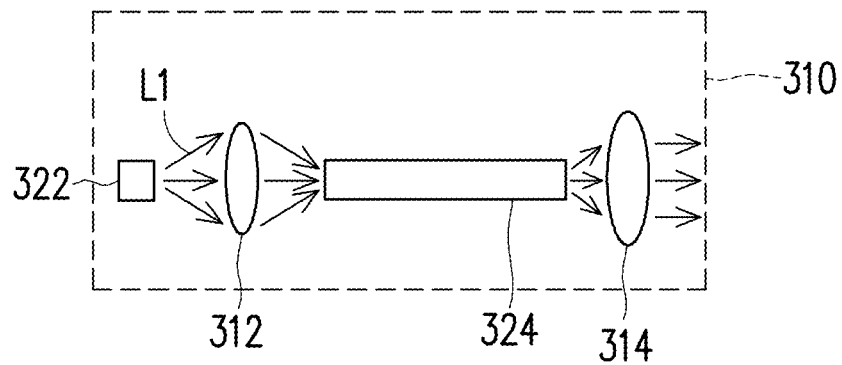
FIG. 4 is an optical schematic view illustrating a light source module according to an embodiment of the invention.

FIG. 3 is a schematic view illustrating an image display device according to an embodiment of the invention. FIG. 4 is a schematic view illustrating a light source module according to an embodiment of the invention. Referring to FIGS. 3 and 4, an image display device 300 of this embodiment includes a light source module 310, an image output element 326, a first lens element 330, a light diffuser 370, a second lens element 340, and an imaging element 328. In this embodiment, the lens module (not numbered) is disposed on the transmitting path of the image beam L2 and between the image output element 326 and the imaging element 328. For a concise description, only the first lens element 330, the light diffuser 370, and the second lens element 340 are shown between the image output element 326 and the imaging element 328 in FIG. 3 However, the invention is not limited thereto. In other embodiments, one or more optical elements may be additionally disposed between the image output element 326 and the first lens element 330 and between the imaging element 328 and the second lens element 340. The invention does not intend to impose a limitation in this regard.

In this embodiment, the light source module 310 includes a light emitting element 322, a lens element 312, a light transmitting element 324, and a light collimating element 314. In this embodiment, the lens element 312 is disposed on a transmitting path of the illumination beam L1 and between the light emitting element 322 and the light transmitting element 324. The light collimating element 314 is disposed on the transmitting path of the illumination beam L1 and between the light transmitting element 324 and the image output element 326.

Specifically, in this embodiment, the light emitting element 322 provides the illumination beam L1 that is modulated in color and meets the needs of the image output element 326, and outputs the illumination beam L1 to the lens element 312. The lens element 312 focuses the illumination beam L1 on the light transmitting element 324. The light transmitting element 324 transmits the illumination beam L1 from the lens element 312 to the light collimating element 314. Then, the light collimating element 314 collimates the illumination beam and transmits the collimated illumination beam L1 to the image output element 326. The image output element 326 outputs the image beam L2 to the first lens element 330, the light diffuser 370, and the second lens element 340 based on the illumination beam L1. The first lens element 330 converges the divergent image beam L2 generated by the image output element 326, so as to focus and form the intermediate image M. The second lens element 340 then focuses the image beam L2 emitted from the intermediate image M on the imaging element 328. The imaging element 328 projects the image beam L2 to the projection target 800, so as to display the image. The projection target 800 is the user's eye, for example.

In this embodiment, the image output element 326 is located on the transmitting path of the image beam L2, and generates the intermediate image M between the first lens element 330 and the second lens element 340. In this embodiment, the light diffuser 370 is disposed on the transmitting path of the image beam L2 and in a predetermined interval d where the intermediate image M is located at the center. For example, according to different designs of the first lens element 330, the intermediate image M may be curved or planar. The light diffuser 370 is a planar optical element, for example. Assuming that a distance from a center of an optical axis of the image output element 326 to a center of an optical axis of the intermediate image M is 1, the light diffuser 370 may be disposed in an area that is an interval plus or minus 10% from the intermediate image M as the center. Therefore, a divergence angle of the image beam L2 is expanded after the image beam L2 passes through the light diffuser 370, and a projection area (e.g., a light spot of the image beam L2) converged onto a projection plane EP is also expanded. In this embodiment, based on different positions where the light diffuser 370 is disposed within the predetermined interval d, the projection area of the image beam L2 projected to the projection target 800 through the light diffuser 370 may differ. In this embodiment, the projection area refers to a cross-sectional area of the projection of the image beam L2 onto the projection plane EP, for example. The projection plane EP is a plane located at a position of the user's pupil, for example. In an embodiment, the light diffuser 370 is disposed at a position where the intermediate image M is generated on the transmitting path of the image beam L2, for example. However, it should be noted that the invention does not intend to impose a limitation on the position where the light diffuser 370 is disposed in the predetermined interval.

In this embodiment, the image output element 326 includes a scanning optical system, for example. A scanning mirror in the scanning optical system scans the emitted illumination beam L1 to different positions to generate the image beam L2. Any framework of scanning optical systems in the art may be implemented as the framework of the scanning optical system of this embodiment. The invention does not intend to impose a limitation in this regard. Common knowledge of the art already provides sufficient teachings concerning the detailed framework and implementation of the scanning optical system. Thus, details in this regard will not be repeated in the following.

In this embodiment, lens elements included in the first lens element 330 and the second lens element 340 may include a variety of lens elements or a combination thereof, such as a lens, a mirror, a curve mirror, a prism, a mirror-prism, a mirror-lens, a prism-lens, a freeform lens/mirror, a Fresnel lens, or the like. The invention does not intend to impose a limitation on the types of the lens elements 312, 330 and 340 and the lens module.

In this embodiment, the light transmitting element 324 may be a wave guide, an optical fiber, an integral rod, a light pipe, or the like, for example, and the invention does not intend to impose a limitation on the types of the light transmitting element 324. In this embodiment, the light collimating element 314 is disposed between the light transmitting element 324 and the image output element 326 to adjust a distribution of a light shape of the illumination beam L1 when the illumination beam L1 enters the image output element 326, so that at least the distribution of the light shape of the illumination beam L1 output by the light transmitting element 324 meets a requirement of the image output element 326. The light collimating element 314 may be a Fresnel lens, a liquid crystal lens, or a gradient reflective index (GRIN) lens, for example. The invention does not intend to impose a limitation on the type of the light collimating element 314.

In this embodiment, the imaging element 328 is configured to change a transmitting direction of the image beam L2 received from the lens module 330 to transmit the image beam L2 to the projection target 800 without completely reflecting the ambient beam L3. In this way, the user is able see the image of the surrounding in perspective. In this embodiment, the imaging element 328 is an optical element such as a transreflective optical element, a curve half-mirror, a liquid crystal lens, a diffraction component, a holography component, a Fresnel lens, or the like. The invention does not intend to impose a limitation on the type of the imaging element 328.

In this embodiment, the image display device 300 is disposed on the corresponding apparatus body in a way similar to that shown in the head-mounted display 100 or 200 in FIG. 1 or 2. As shown in FIG. 1 or 2, the light source module 310 is disposed at the holder of the spectacles or eyeglasses, for example. However, the invention does not intend to impose a limitation on a location of the light source module 310. In this embodiment, based on practical needs, the light source module 310 may also be disposed at the frame or other appropriate locations. Besides, the descriptions of the embodiments shown in FIGS. 1 and 2 have provided sufficient teaching, suggestions, and explanations for embodiment concerning the locations and operations of the respective components in the image display device 300 of this embodiment. Thus, details in these regards will not be reiterated below.

Figure 5:
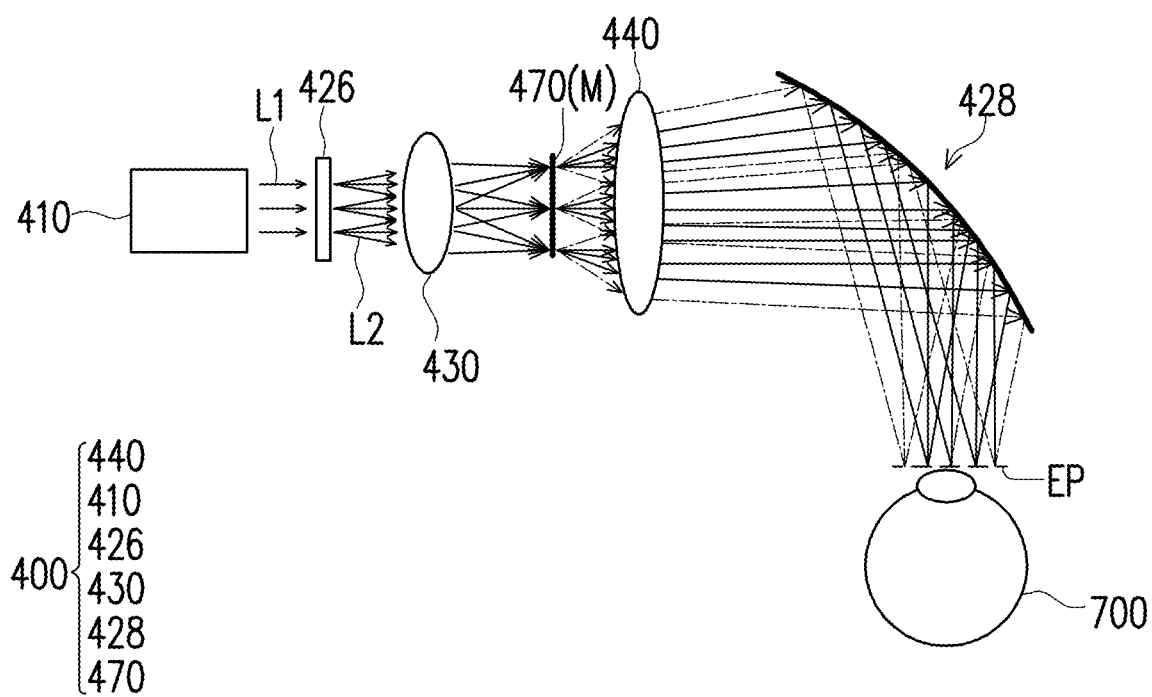
FIG. 5 is an optical schematic view illustrating an image display device according to another embodiment of the invention.

FIG. 5 is a schematic view illustrating an image display device according to another embodiment of the invention. Referring to FIGS. 3 and 5, a head-mounted display 400 of this embodiment is similar to the head-mounted display 300 in the embodiment shown in FIG. 3. The difference therebetween mainly lies in a light diffuser 470. In an embodiment, the light diffuser 470 is disposed at the position where the intermediate image M is generated on the transmitting path of the image beam L2, for example. In this embodiment, the image display device 400 includes a light source module 410, an image output element 426, a first lens element 430, the light diffuser 470, a second lens element 440, and an imaging element 428. The image display device 400 is configured to project the image beam L2 to a projection target 700 through the light diffuser 470, so as to display the image. The projection target 700 is the user's eye, for example. Thus, the image beam L2 has a larger projection area on the projection target.

Besides, the descriptions of the embodiments shown in FIGS. 1 to 3 have provided sufficient teaching, suggestions, and explanations for embodiment concerning the locations and operations of the respective components in the image display device 400 of this embodiment. Thus, details in these regards will not be reiterated below.

In the embodiments of the invention, as the position where the light diffuser is disposed within the predetermined interval differs, the projection area of the image beam projected to the projection target through the light diffuser may also differ. In addition, a light shape of projection of the image beam on the projection target is determined by a shape of the light diffuser.

Figure 6A:
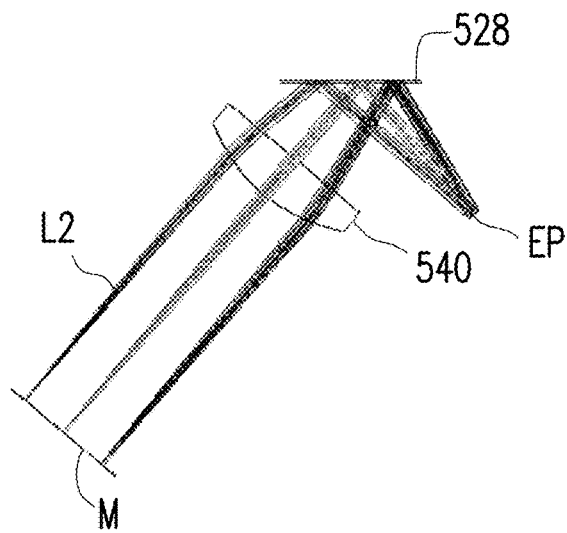
FIG. 6A is a schematic side view illustrating that an image beam is projected to a projection target according to an embodiment of the invention.
Figure 6B:
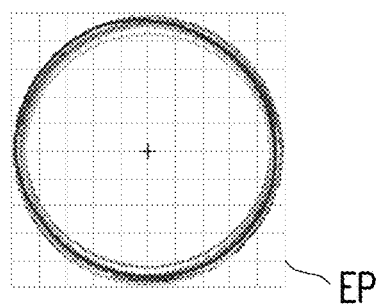
FIG. 6B is a schematic view illustrating that the image beam of FIG. 6A is projected to a projection plane.
Figure 6C:
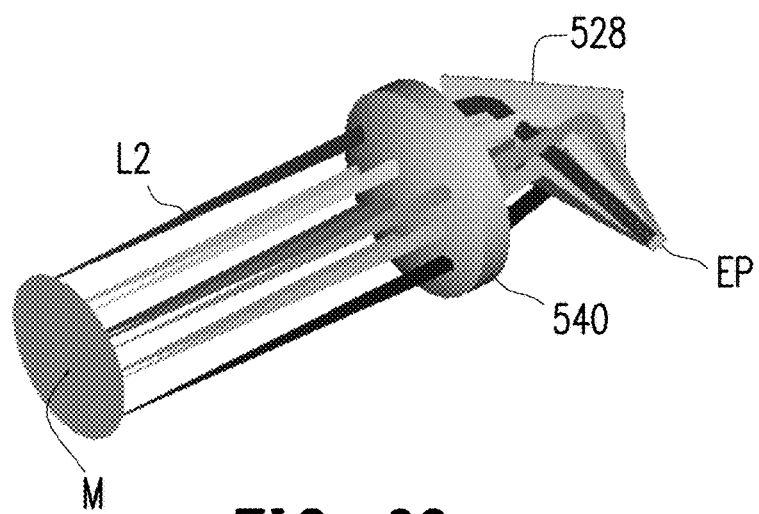
FIG. 6C is a schematic perspective view illustrating that the image beam of FIG. 6A is projected to the projection plane.

FIG. 6A is a schematic side view illustrating that an image beam is projected to a projection target according to a related example of the invention. FIG. 6B is a schematic view illustrating that the image beam of FIG. 6A is projected to a projection plane. FIG. 6C is a schematic perspective view illustrating that the image beam of FIG. 6A is projected to the projection plane. Referring to FIGS. 6A to 6C, the image beam L2 in the related example is directly transmitted from the position where the intermediate image M is generated to a second lens element 540 without mediation of the light diffuser, for example. In the related example, the image beam L2 is projected on the projection plane EP, and a projection area of the image beam L2 (in a circular shape, for example) corresponds to a circular area with a diameter of about 0.9 millimeters.

Figure 7A:
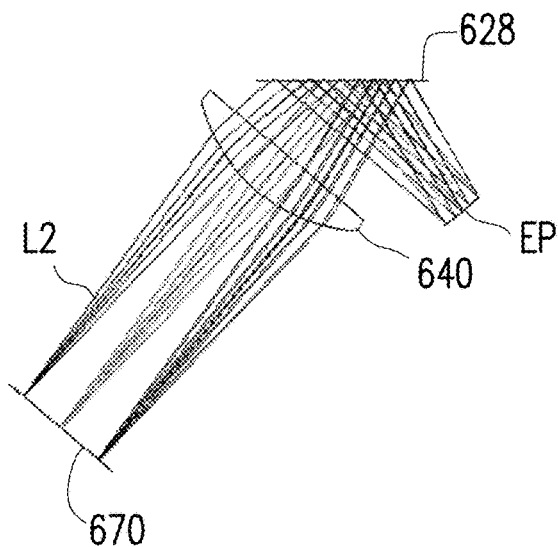
FIGS. 7A, 8A, 9A, and 10A are schematic side views illustrating that an image beam is projected to a projection target according to different embodiments of the invention.
Figure 7B:
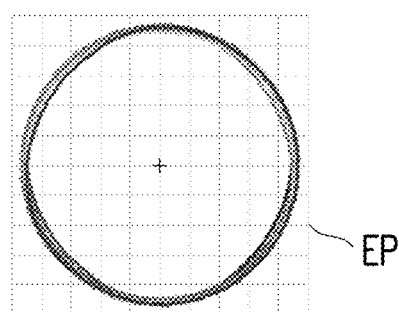
FIGS. 7B, 8B, 9B, and 10B are schematic views respectively illustrating that the image beams of FIGS. 7A, 8A, 9A, and 10A are projected to a projection plane.
Figure 7C:
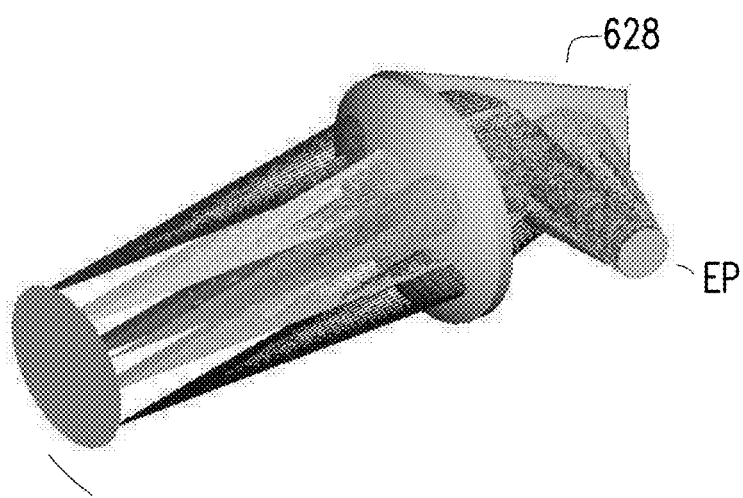
FIGS. 7C, 8C, 9C, and 10C are schematic perspective views respectively illustrating that the image beams of FIGS. 7A, 8A, 9A, and 10A are projected to the projection plane.

FIG. 7A is a schematic side view illustrating that an image beam is projected to a projection target according to an embodiment of the invention. FIG. 7B is a schematic view illustrating that the image beam of FIG. 7A is projected to a projection plane. FIG. 7C is a schematic perspective view illustrating that the image beam of FIG. 7A is projected to the projection plane. Referring to FIGS. 7A to 7C, the image beam L2 of this embodiment is transmitted to a second lens element 640 after mediation of a light diffuser 670, for example. In this embodiment, the image beam L2 is projected on the projection plane EP, and the projection area of the image beam L2 (in a circular shape, for example) corresponds to a circular area with a diameter of about 3 millimeters. Besides, in this embodiment, a shape of a cross-section of the light diffuser 670 is circular. Therefore, the light shape of projection of the image beam L2 on the projection target is determined by the shape of the light diffuser 670 and is substantially consistent in shape with the light diffuser 670. Namely, the light shape of projection of the image beam L2 on the projection target is also circular. In this embodiment, taking FIG. 3 as an example, the light diffuser 670 is disposed within the predetermined interval d, for example, where the intermediate image M is located at the center.

Figure 8A:
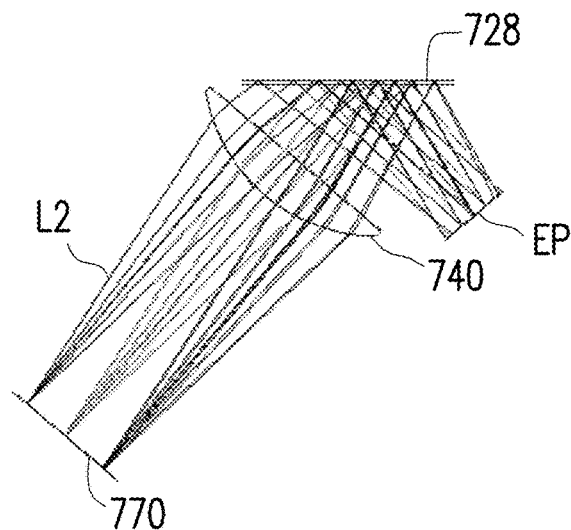
Figure 8B:
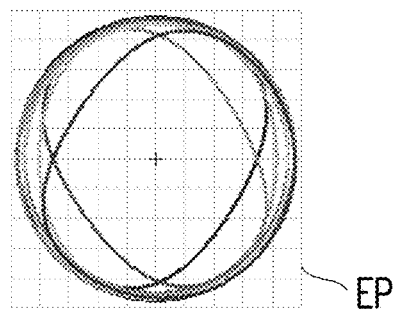
Figure 8C:
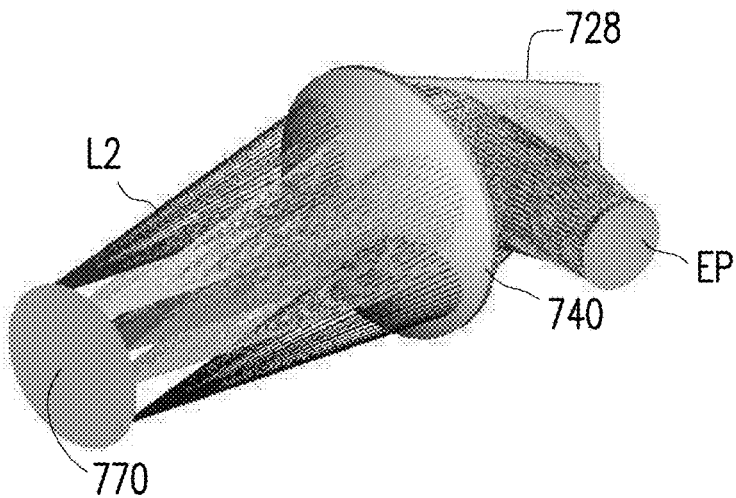

FIG. 8A is a schematic side view illustrating that an image beam is projected to a projection target according to another embodiment of the invention. FIG. 8B is a schematic view illustrating that the image beam of FIG. 8A is projected to a projection plane. FIG. 8C is a schematic perspective view illustrating that the image beam of FIG. 8A is projected to the projection plane. Referring to FIGS. 8A to 8C, the image beam L2 of this embodiment is transmitted to a second lens element 740 after mediation of a light diffuser 770, for example. In this embodiment, the image beam L2 is projected on the projection plane EP, and the projection area of the image beam L2 (in a circular shape, for example) corresponds to a circular area with a diameter of about 5 millimeters. Besides, in this embodiment, a shape of the light diffuser 770 is circular. Therefore, the light shape of projection of the image beam L2 on the projection target is determined by the shape of the light diffuser 770 and is substantially consistent in shape with the light diffuser 770. Namely, the light shape of projection of the image beam L2 on the projection target is also circular. In this embodiment, taking FIG. 3 as an example, the light diffuser 770 is disposed within the predetermined interval d, for example, where the intermediate image M is located at the center.

Figure 9A:
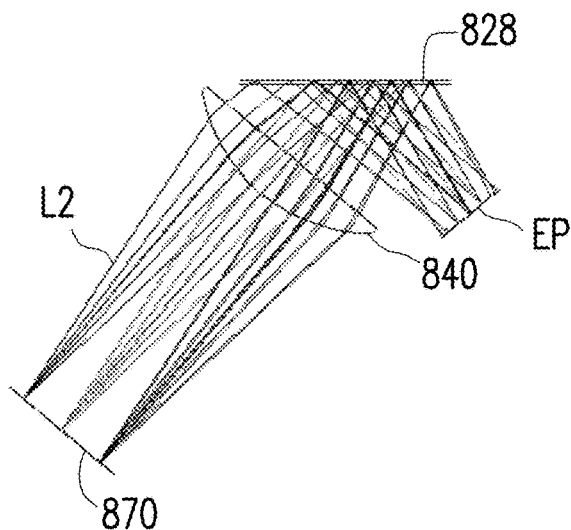
Figure 9B:
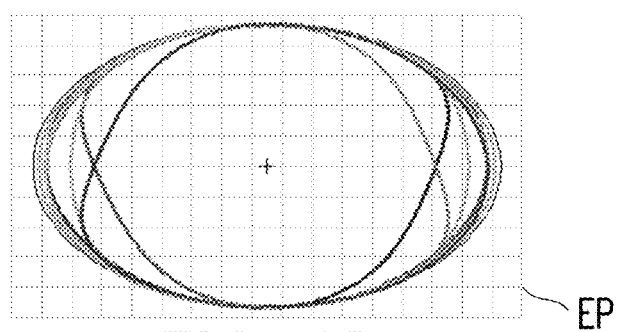
Figure 9C:
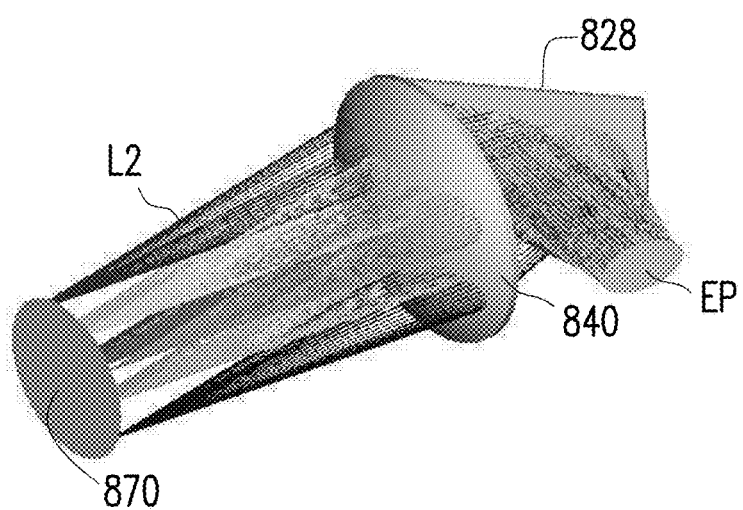

FIG. 9A is a schematic side view illustrating that an image beam is projected to a projection target according to another embodiment of the invention. FIG. 9B is a schematic view illustrating that the image beam of FIG. 9A is projected to a projection plane. FIG. 9C is a schematic perspective view illustrating that the image beam of FIG. 9A is projected to the projection plane. Referring to FIGS. 9A to 9C, the image beam L2 of this embodiment is transmitted to a second lens element 840 after mediation of a light diffuser 870, for example. In this embodiment, the image beam L2 is projected on the projection plane EP, and the projection area of the image beam L2 (in an elliptical shape, for example) corresponds to an elliptical area having a long axis with a length of 5 millimeters and a short axis with a length of 3 millimeters. Besides, in this embodiment, a shape of the light diffuser 870 is elliptical. Therefore, the light shape of projection of the image beam L2 on the projection target is determined by the shape of the light diffuser 870 and is substantially consistent in shape with the light diffuser 870. Namely, the light shape of projection of the image beam L2 on the projection target is also elliptical. In this embodiment, taking FIG. 3 as an example, the light diffuser 870 is disposed within the predetermined interval d, for example, where the intermediate image M is located at the center.

Figure 10A:
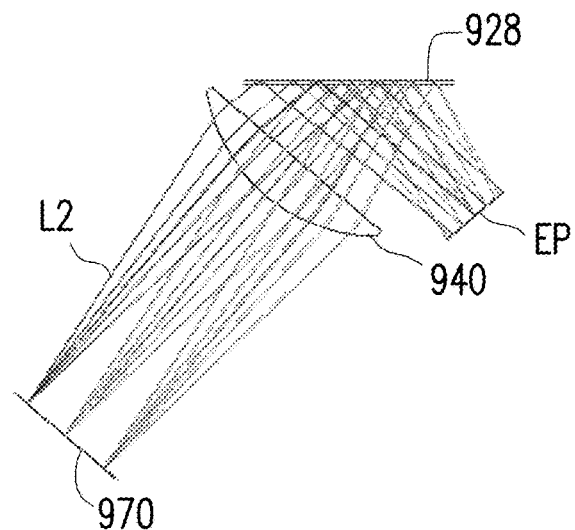
Figure 10B:
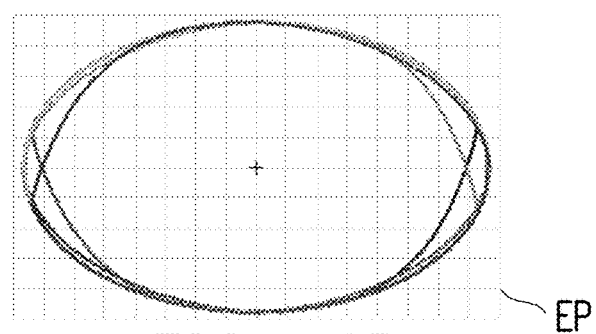
Figure 10C:
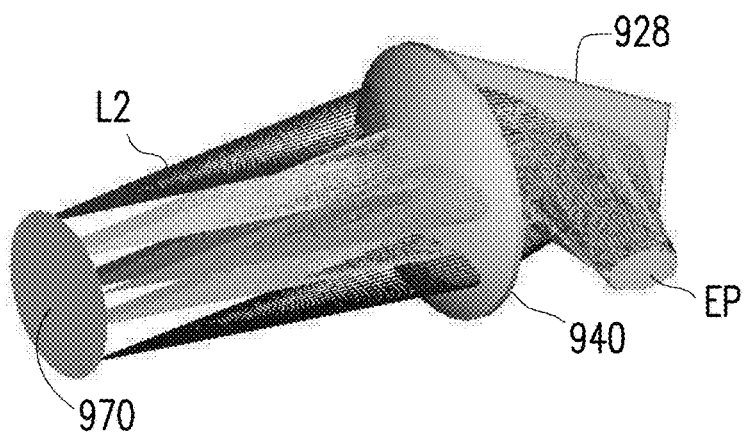

FIG. 10A is a schematic side view illustrating that an image beam is projected to a projection target according to another embodiment of the invention. FIG. 10B is a schematic view illustrating that the image beam of FIG. 10A is projected to a projection plane. FIG. 10C is a schematic perspective view illustrating that the image beam of FIG. 10A is projected to the projection plane. Referring to FIGS. 10A to 10C, the image beam L2 of this embodiment is transmitted to a second lens element 940 after mediation of a light diffuser 970, for example. In this embodiment, the image beam L2 is projected on the projection plane EP, and the projection area of the image beam L2 (in an elliptical shape, for example) corresponds to an elliptical area having a long axis with a length of 4 millimeters and a short axis with a length of 2.5 millimeters. Besides, in this embodiment, a shape of the light diffuser 970 is elliptical. Therefore, the light shape of projection of the image beam L2 on the projection target is determined by the shape of the light diffuser 970 and is substantially consistent in shape with the light diffuser 970. Namely, the light shape of projection of the image beam L2 on the projection target is also elliptical. In this embodiment, taking FIG. 3 as an example, the light diffuser 970 is disposed within the predetermined interval d, for example, where the intermediate image M is located at the center.

In the embodiment of FIG. 2, the imaging element 228 may be integrated onto and combined together with the lens or, as shown in FIG. 1, disposed at the inner side of the lens and tightly attached to the lens. In an embodiment, the image display device may not include the imaging element, but is instead provided with an optical waveguide element to receive the image beam L2 from the light diffuser. In addition, the optical waveguide element may project the image beam L2 to the eye of the user 900 (i.e., another projection target). The optical waveguide element may be a part of or the whole lens, for example.

Figure 11:
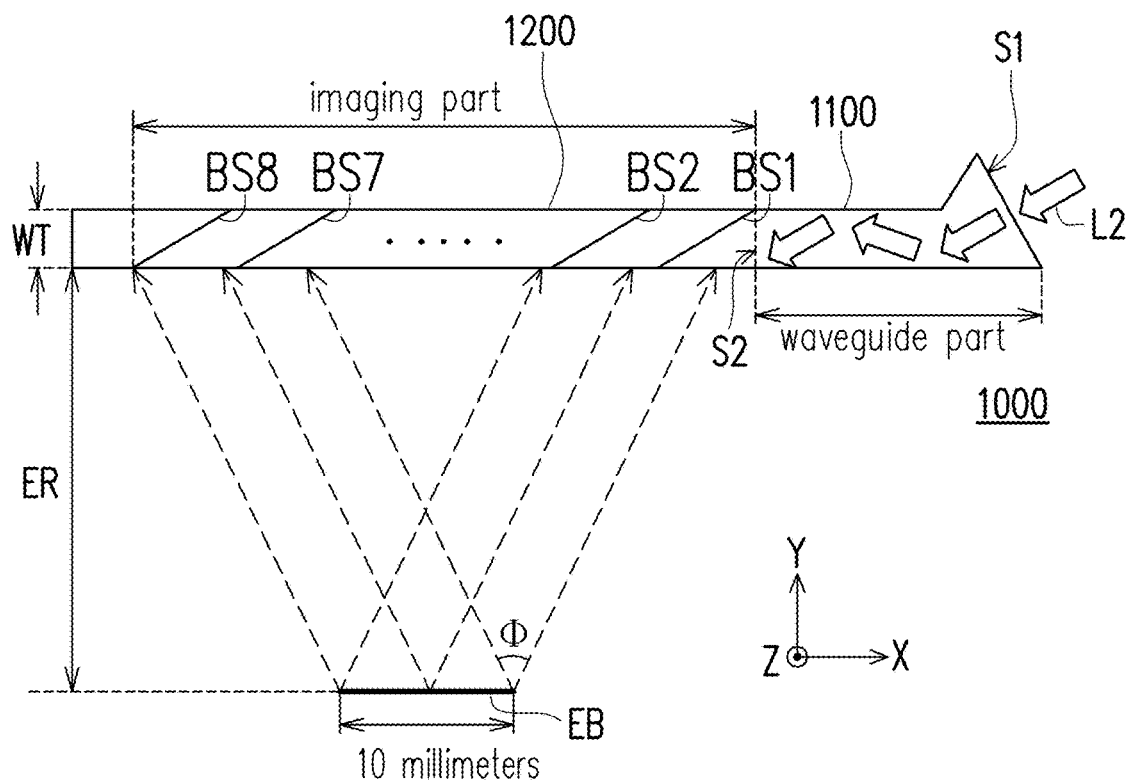
FIG. 11 is a schematic cross-sectional view illustrating an optical waveguide element according to an embodiment of the invention.
Figure 12:
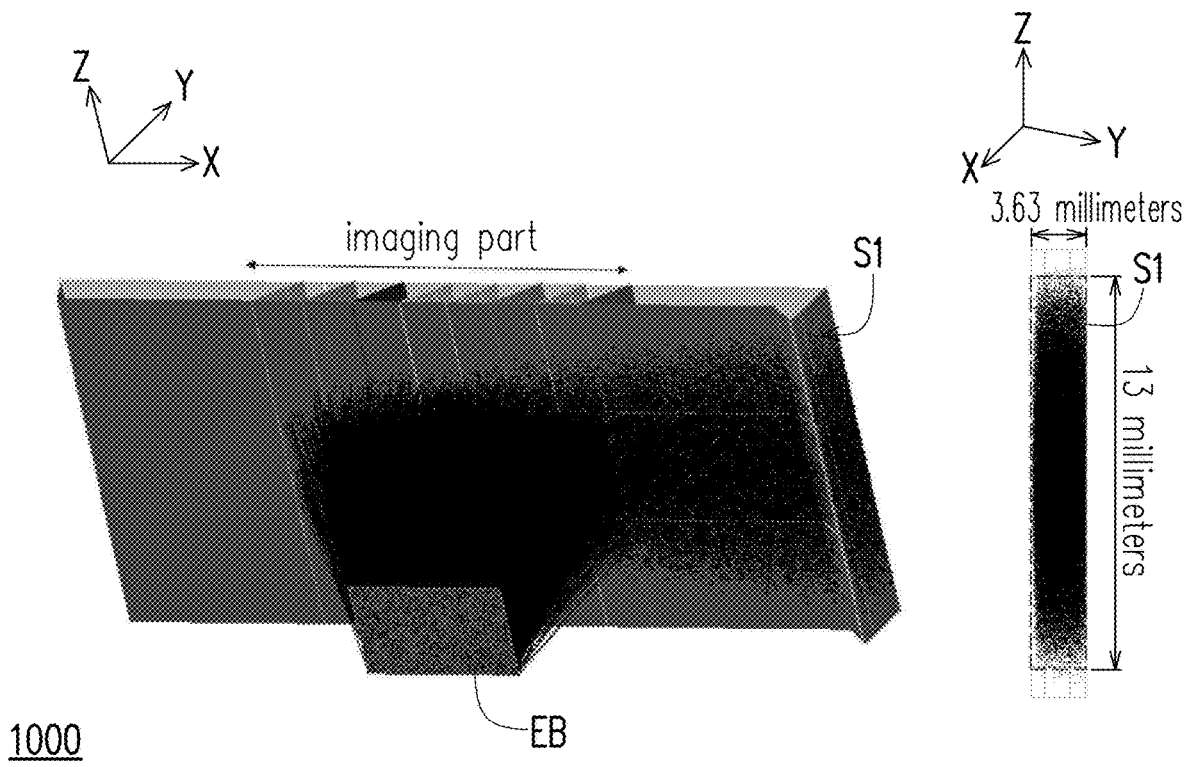
FIG. 12 is a schematic perspective view illustrating the optical waveguide element according to the embodiment of FIG. 11.
Figure 13:
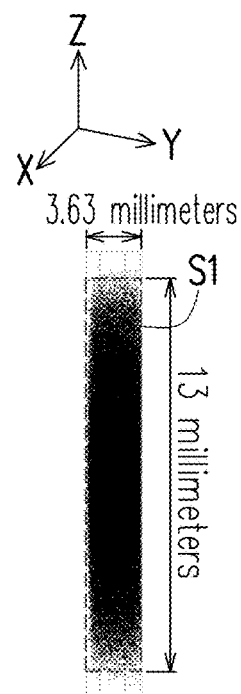
FIG. 13 is a schematic view illustrating a light spot of a light input end of the optical waveguide element according to the embodiment of FIG. 11.

FIG. 11 is a schematic cross-sectional view illustrating an optical waveguide element according to an embodiment of the invention. FIG. 12 is a schematic perspective view illustrating the optical waveguide element according to the embodiment of FIG. 11. FIG. 13 is a schematic view illustrating a light spot of a light input end of the optical waveguide element according to the embodiment of FIG. 11. Referring to FIGS. 11 to 13, the image beam L2 of the embodiment is transmitted to an optical waveguide element 1000 via a lens element (e.g., the lens elements 221_1, 221_2, and 221_3 of FIG. 2) and a light diffuser (e.g., the light diffuser 227 of FIG. 2), for example. The optical waveguide element 1000 projects the image beam L2 to a projection target EB, such as the eye of the user 900, by virtual image projection. In the embodiment, the optical waveguide element 1000 adjusts the light shape (i.e., light spot) of projection of the image beam L2, so as to expand a projection area of the image beam L2 projected to the projection target EB.

Specifically, in the embodiment, the optical waveguide element 1000 includes a waveguide part 1100 and an imaging part 1200. The waveguide part 1100 is configured to receive the image beam L2. The waveguide part 1100 includes a light input end S1 and a light output end S2. The light input end S1 includes a light input surface, for example. The image beam L2 is input to the waveguide part 1100 of the optical waveguide element 1000 from the light input surface of the light input end S1. The light output end S2 is a surface where the waveguide part 1100 and the imaging part 1200 are connected, for example. The image beam L2 is output from the waveguide part 1100 through the light output end S2 and enters the imaging part 1200. In the embodiment, a light transmission medium of the waveguide part 1100 is distributed continuously from the light input end S1 to the light output end S2. In addition, the light input end S1 and the light output end S2 are respectively located at opposite sides of the waveguide part 1100. The image beam L2 entering the waveguide part 1100 from the light input end S1 undergoes total reflection in the waveguide part 1100 and is transmitted to the light output end S2. In the embodiment, the light input surface of the light input end S1 of the waveguide part 1100 is in a rectangular shape, and the light shape of projection of the image beam L2 at the light input end S1 is in an elongated elliptical shape, as shown in FIG. 13. In addition, the light transmission medium of the waveguide part 1100 includes, for example, a light transmissive material, such as glass (including optical glass such as quartz glass or BK7 glass), a plastic material (e.g., polymethylmethacrylate, polycarbonate resin, acrylic resin, amorphous polypropylene resin, styrene resin including AS resin, or the like), or the like.

In the embodiment, the waveguide part 1100 may adjust the light shape of projection of the image beam L2 on the projection target EB in a first direction Z, such as increasing a length of the light shape of projection of the image beam L2 on the projection target EB in the first direction Z. The imaging part 1200 includes a beam splitter array. The beam splitter array includes a plurality of beam splitters BS1 to BS8 arranged along a second direction X and disposed in parallel to each other. Each of the beam splitters BS1 to BS8 is an optical element allowing part of the light to pass through and part of the light to be reflected, so as to project the image beam L2 from the waveguide part 1100 to the projection target EB by virtual image projection. It should be noted that the invention does not intend to impose a limitation on the number and arrangement of the beam splitters BS1 to BS8. In the embodiment, the imaging part 1200 may adjust the light shape of projection of the image beam L2 on the projection target EB in the second direction X, such as increasing a length of the light shape of projection of the image beam L2 on the projection target EB in the second direction X.

In the embodiment, a thickness WT of the imaging part 1200 is 1.95 millimeters, and a distance ER between the imaging part 1200 and the projection target EB is 15 millimeters. The projection target EB is in a rectangular shape with a length of 10 millimeters and a width of 8 millimeters. A field of view Φ of the user 900 is 60 degrees. The light input surface of the light input end S1 is in a rectangular shape with a length of 13 millimeters and a width of 3.63 millimeters. The respective optical and structural parameters are described above for an illustrative purpose, and shall not be construed as limitations of the invention. In the embodiment, the light transmission medium of the waveguide part 1100 is distributed continuously from the light input end S1 to the light output end S2. Without the beam splitter, the waveguide part 1100 is already capable of increasing the length of the light shape of projection of the image beam L2 on the projection target EB in the first direction Z. Therefore, the design simplifies the structure of the optical waveguide element 1100 and reduces the manufacturing cost of the optical waveguide element 1000. Moreover, compared with the conventional waveguide part including a beam splitter, the waveguide part of the embodiment does not include a beam splitter and is capable of increasing the field of view Φ of the user 900 with respect to the projection target EB. Moreover, the size of the waveguide element is not limited by the beam splitter.

Figure 14:
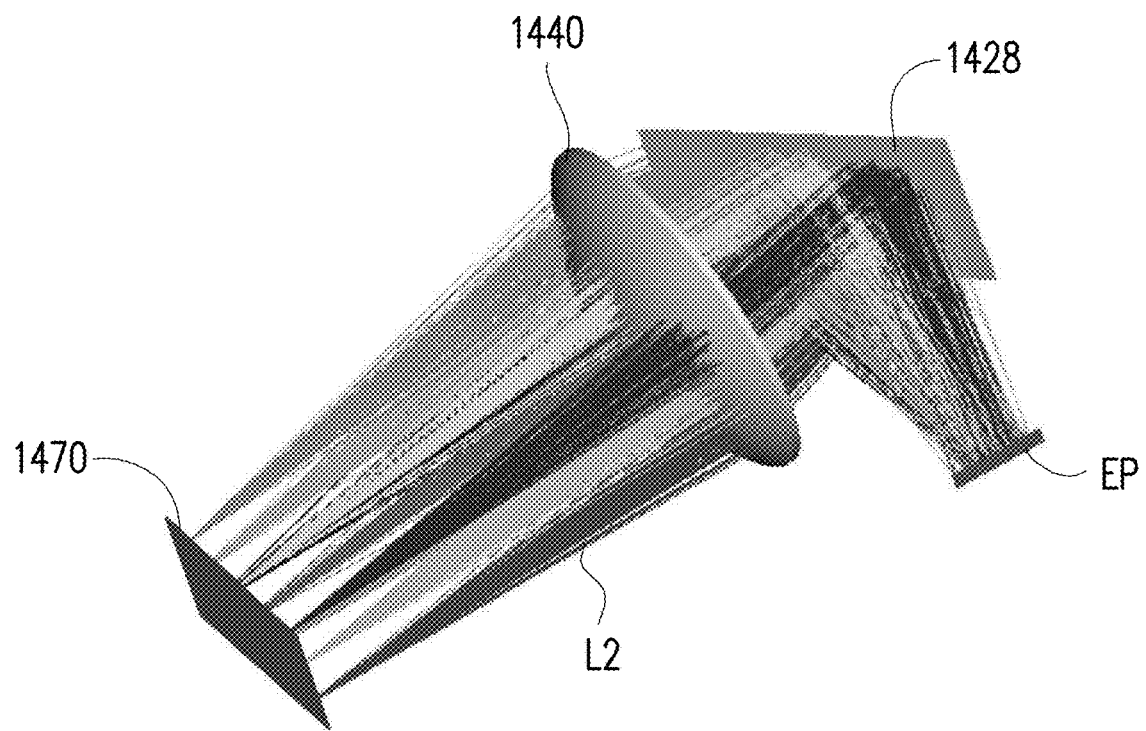
FIG. 14 is a schematic perspective view illustrating an image beam projected to an optical waveguide element according to an embodiment of the invention.
Figure 15:
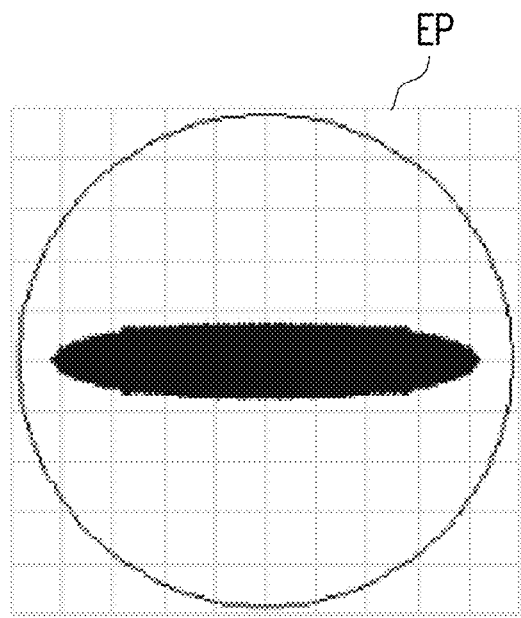
FIG. 15 is a schematic view illustrating that an image beam of FIG. 1 is projected to a projection plane.

FIG. 14 is a schematic perspective view illustrating an image beam projected to an optical waveguide element according to an embodiment of the invention. FIG. 15 is a schematic view illustrating that an image beam of FIG. 14 is projected to a projection plane. Referring to FIGS. 11 to 15, after the image beam L2 of the embodiment is modulated by a light diffuser 1470, the image beam L2 is transmitted to a mirror element 1428 through a second lens element 1440. In the embodiment, the image beam L2 is projected onto the projection plane EP (i.e., the projection target) after being reflected by the mirror element 1428. In the embodiment, some components of an image display device configured to generate the image beam L2 are configured at the same positions as those of some components of the image display device of the foregoing embodiments. The difference is that the embodiment does not include an imaging element, but transmits the image beam L2 from the light diffuser 1470 to the optical waveguide element 1000 by the mirror element 1428. In addition, the optical waveguide element 1000 is disposed at the position of the projection target of the foregoing embodiments. For example, the light input surface of the light input end S1 is located on the projection plane EP. Then, the optical waveguide element 1000 projects the image beam L2 input from the light input end S1 to another projection target EB. The eye of the user 900 is at the projection target EB, for example, so as to receive more of the image beam L2. In an embodiment, the image display device may not include the mirror element 1428, but receive the image beam L2 from the second lens element 1440 by the optical waveguide element 1000. In addition, the optical waveguide element 1000 projects the image beam L2 to the eye of the user 900. Furthermore, an ambient beam may pass through the imaging part 1200 of the optical waveguide element 1000 and be projected to the another projection target EB. In this case, the user may see a background environment and a virtual image generated by the image beam L2.

In the embodiment, the light diffuser 1470 adjusts the light shape of projection of the image beam L2 input to the light input end S1 of the optical waveguide element 1000, so as to conform to the shape of the light input surface of the light input end S1. For example, the light input surface of the waveguide part of the embodiment is in a rectangular shape. The light diffuser 1470 adjusts the light shape of projection of image beam L2 at the light input end S1 to be elliptical. Namely, the light diffuser 1470 may expand the light shape of projection of the image beam L2 on the projection target EB in the first direction Z, as shown in FIGS. 12, 13, and 15. FIG. 15 illustrates the light shape of projection of the image beam L2 projected to the projection plane EP (i.e., the light input surface), and the light shape of projection is in an elliptical shape, conforming to the rectangular light input surface. In the embodiment, the light diffuser 1470 is disposed on the transmitting path of the image beam L2 and located at a predetermined interval with the intermediate image M as the center, so as to adjust the light shape of projection of the image beam L2 input to the light input end S1 to a shape conforming to the light input surface, thereby facilitating an optical efficiency of the system. Compared with the conventional head-mounted display with an optical waveguide element, the display device of the invention requires only one beam splitter array to increase the lengths of the light shape of projection of the image beam L2 in the first direction Z and the second direction X and expand the projection area of the image beam L2 projected to the projection target EB.

Figure 16:
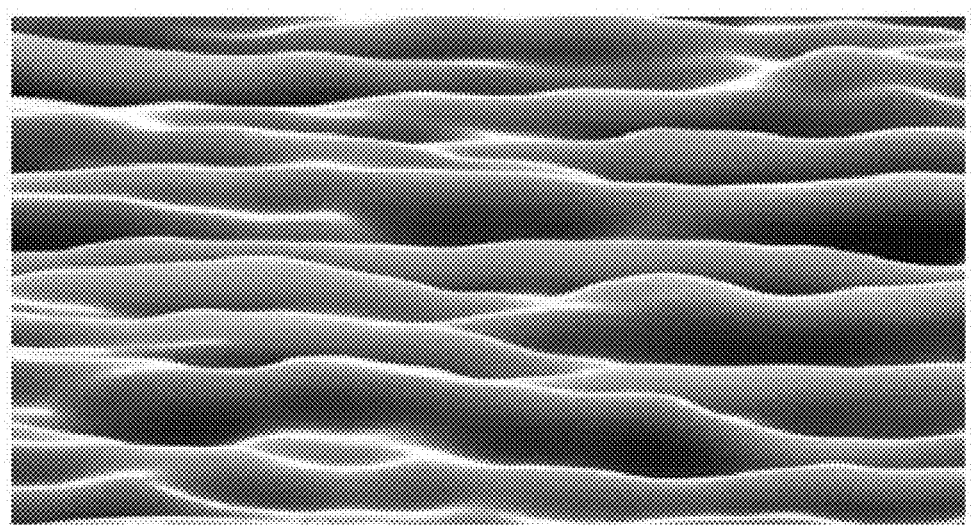
FIG. 16 is a schematic view illustrating a surface microstructure of a light diffuser according to an embodiment of the invention.

FIG. 16 is a schematic view illustrating a surface microstructure of a light diffuser according to an embodiment of the invention. Referring to FIG. 16, in the embodiment, taking the light diffuser 1470 as an example, a surface microstructure of the light diffuser 1470 includes a plurality of microstructure units (without marking of reference symbols) arranged in a direction and extending in another direction, as shown in FIG. 16. The light diffuser 1470 with the microstructure may adjust the light shape of projection of the image beam L2 input to the light input end S1 to conform to the shape of the light input surface. Therefore, in the embodiment, the light shape of projection of the image beam L2 at the projection target is determined based on the design of the microstructure of the light diffuser 1470. The microstructure of the light diffuser 1470 is only described herein for an illustrative purpose, and shall not be construed as a limitation of the invention.

In view of the above, the embodiments of the invention at least have one of the following advantages or effects. In the image display device of the embodiments of the invention, the image beam projected to the projection target through the light diffuser may have a projection area greater than 19.6 mm². The head-mounted display does not require installation of an additional adjustment system for adjusting the position of projection, and may thus be more light-weighted. In addition, the user may readily use the head-mounted display without making additional adjustment to the position of projection. Thus, the device becomes easier to use. Moreover, with the image display device according to the embodiments of the invention, the user's field of view (FOV) is expanded, and the size and weight of the head-mounted display are also reduced.

Furthermore, the respective optical components of the image display device are disposed dispersedly on the apparatus body. Such configuration may reduce the crowdedness caused by a collective arrangement of the respective optical components on the apparatus body, and the weights of the components are also shared by different parts of the user. Thus, the weight of the head-mounted display is evenly distributed, thereby making the heat-mounted display comfortable to wear. In addition, since the imaging element is integrated onto the glass of the spectacles or located at the inner side of the glass and tightly attached to the glass, the appearance of the head-mounted display is fashionable, and the awkwardness is significantly reduced. Besides, the head-mounted display with the optical waveguide element requires only one beam splitter array to expand the projection area of the image beam projected to the projection target. Therefore, the structure of the optical waveguide element is simplified, and the cost of the head-mounted display is reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-mounted display, comprising:
    an apparatus body, comprising a first part and a second part connected to the first part; and
    an image display device, disposed in the apparatus body, configured to project an image to a projection target, and comprising a light source module, an image output element, a plurality of lens elements, and a light diffuser, wherein the light source module is configured to output an illumination beam to the image output element, the image output element modulates the illumination beam to form an image beam to be outputted and projected to the projection target by virtual image projection to display the image, wherein the lens elements comprise a first lens element and a second lens element, the first lens element is disposed on a transmission path of the image beam and between the image output element and the light diffuser, the first lens element converges the image beam outputted from the image output element, the image output element generates an intermediate image on the transmitting path of the image beam and between the first lens element and the second lens element, and the light diffuser is disposed on the transmitting path of the image beam, between the first lens element and the second lens element, and within a predetermined interval where the intermediate image is located at the center, wherein a light shape of projection of the image beam on the projection target is determined by a microstructure of the light diffuser.

2. The head-mounted display as claimed in claim 1, wherein the light diffuser is disposed on the transmitting path of the image beam and located at a position where the intermediate image is generated.

3. The head-mounted display as claimed in claim 2, wherein the lens elements and the light diffuser are disposed in the first part of the apparatus body.

4. The head-mounted display as claimed in claim 1, wherein the image output element comprises a scanning optical system.

5. The head-mounted display as claimed in claim 1, wherein the image display device further comprises a light source module configured to output an illumination beam to the image output element, the image output element outputs the image beam based on the illumination beam, and projects the image beam to the projection target through the lens element and the light diffuser, wherein the light source module is disposed in the first part of the apparatus body.

6. The head mounted display as claimed in claim 1, wherein the image display device further comprises an imaging element, the image beam is transmitted to the imaging element through the lens elements and the light diffuser, and the imaging element projects the image beam to the projection target by virtual image projection, so as to display the image.

7. The head-mounted display as claimed in claim 6, wherein the imaging element is disposed in one of the first part and the second part of the apparatus body.

8. The head-mounted display as claimed in claim 1, wherein the apparatus body comprises spectacles, the second part comprises a glass, and the first part comprises at least one of a frame, a holder, and a nose pad.

9. The head-mounted display as claimed in claim 1, wherein an ambient beam passes through the second part of the apparatus body and is projected to the projection target.

10. A head-mounted display, comprising:
an apparatus body, comprising a first part and a second part connected to the first part; and
an image display device, disposed in the apparatus body, configured to project an image to a projection target, and comprising an image output element, a plurality of lens elements, and a light diffuser, wherein the image output element outputs an image beam projected to the projection target by virtual image projection to display the image, wherein the lens elements comprise a first lens element and a second lens element, the image output element generates an intermediate image on a transmitting path of the image beam and between the first lens element and the second lens element, and the light diffuser is disposed on the transmitting path of the image beam and within a predetermined interval where the intermediate image is located at the center, wherein the image beam projected to the projection target through the light diffuser has a projection area greater than 19.6 mm$^2$.

11. A head-mounted display, comprising:
an apparatus body, comprising a first part and a second part connected to the first part; and
an image display device, disposed in the apparatus body, configured to project an image to a projection target, and comprising an image output element, a plurality of lens elements, and a light diffuser, wherein the image output element outputs an image beam projected to the projection target by virtual image projection to display the image, wherein the lens elements comprise a first lens element and a second lens element, the image output element generates an intermediate image on a transmitting path of the image beam and between the first lens element and the second lens element, and the light diffuser is disposed on the transmitting path of the image beam and within a predetermined interval where the intermediate image is located at the center, wherein the second part of the apparatus body comprises at least one optical waveguide element disposed at a position of the projection target, the image beam is transmitted to the at least one optical waveguide element through the lens elements and the light diffuser, and the at least one optical waveguide element receiving the image beam projects the image beam to another projection target by virtual image projection, wherein the at least one optical waveguide element adjusts a light shape of projection of the image beam to expand a projection area of the image beam projected to the another projection target.

12. The head-mounted display as claimed in claim 11, wherein the waveguide part comprises a light input end and a light output end, the image beam is input to the waveguide part from the light input end and output from the waveguide part through the light output end, and a light transmission medium of the waveguide part is continuously distributed from the light input end to the light output end.

13. The head-mounted display as claimed in claim 12, wherein the optical waveguide element further comprises an imaging part, the image beam input from the at least one optical waveguide element is transmitted to the imaging part, and the imaging part adjusts a light shape of projection of the image beam on the another projection target in a second direction.

14. The head-mounted display as claimed in claim 13, wherein the imaging part comprises a beam splitter array comprising a plurality of beam splitters arranged along the second direction and disposed in parallel to each other.

15. The head-mounted display as claimed in claim 12, wherein the light input end of the waveguide part comprises a light input surface disposed at the position of the projection target, and the light diffuser adjusts a light shape of projection of the image beam input to the light input surface, so as to conform to a shape of the light input surface.

16. The head-mounted display as claimed in claim 15, wherein the light input surface of the waveguide part is in a rectangular shape, and the light diffuser adjusts the image beam such that the light shape of projection of the image beam on the light input surface is in an elliptical shape.

* * * * *